United States Patent [19]

Ohmori et al.

[11] Patent Number: 4,832,712

[45] Date of Patent: May 23, 1989

[54] GAS SEPARATING MEMBRANE

[75] Inventors: Akira Ohmori, Ibaraki; Takashi Yasuhara, Settsu; Takahiro Kitahara, Suita, all of Japan

[73] Assignee: Daikin Industries, Ltd., Japan

[21] Appl. No.: 113,206

[22] Filed: Oct. 27, 1987

[30] Foreign Application Priority Data

Nov. 5, 1986 [JP] Japan ................... 61-263040

[51] Int. Cl.$^4$ ............................................. B01D 53/22
[52] U.S. Cl. .......................................... 55/158; 55/16; 55/68; 526/246
[58] Field of Search ................ 55/16, 68, 158; 526/246

[56] References Cited

U.S. PATENT DOCUMENTS

| | | | |
|---|---|---|---|
| 4,230,463 | 10/1980 | Henis et al. | 55/16 |
| 4,427,419 | 1/1984 | Li | 55/16 |
| 4,439,217 | 3/1984 | Yamabe et al. | 55/16 X |
| 4,644,043 | 2/1987 | Ohmori et al. | 526/246 |
| 4,701,186 | 10/1987 | Zampini | 55/158 |

FOREIGN PATENT DOCUMENTS

| | | | |
|---|---|---|---|
| 122049 | 10/1984 | European Pat. Off. | 55/158 |
| 92449 | 6/1983 | Japan | 55/158 |
| 73706 | 4/1986 | Japan | 55/158 |
| 106820 | 5/1987 | Japan | 55/158 |

*Primary Examiner*—Robert Spitzer
*Attorney, Agent, or Firm*—Larson and Taylor

[57] ABSTRACT

Disclosed are a gas separating membrane prepared from a polymer from a monomer represented by the formula (1):

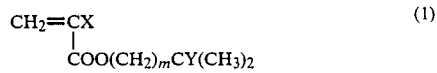

$$CH_2=CX \atop COO(CH_2)_mCY(CH_3)_2 \qquad (1)$$

wherein X is chlorine atom or fluorine atom, Y is hydrogen atom or methyl group, and m is 0 or an integer of 1 to 5, and a gas separating membrane prepared from a polymer of the monomer of the formula (1) in an amount of up to 100% by weight and other ethylenically unsaturated monomer in an amount of not more than 50% by weight, based on the combined weight of the monomer of the formula (1) and the other ethylenically unsaturated monomer.

2 Claims, No Drawings

GAS SEPARATING MEMBRANE

FIELD OF THE INVENTION

The present invention relates to a gas separating membrane for use in producing oxygen-enriched air.

DESCRIPTION OF THE PRIOR ART

Silicone, polyacetylene, polyfluoroalkyl methacrylate and the like are known as polymeric materials of gas separating membranes for producing oxygen-enriched air. However, the gas separating membranes composed of silicone, polyacetylene or the like are great in the oxygen permeability coefficient but small in the separation coefficient which is the ratio of oxygen permeability coefficient to nitrogen permeability coefficient. With this limitation, these membranes produce only oxygen-enriched air having an oxygen concentration of about 30% by volume at highest. On the other hand, the gas separating membranes formed of polyfluoroalkyl methacrylate or the like are great in the separation coefficient and capable of producing oxygen-enriched air in an oxygen concentration of at least 40% by volume. Yet these membranes are small in the oxygen permeability coefficient and consequently entail difficulties in producing large amounts of oxygen-enriched air.

OBJECT OF THE INVENTION

It is an object of the present invention to provide a gas separating membrane capable of producing large amounts of oxygen-enriched air having a high oxygen concentration.

We conducted extensive research to develop gas separating membranes capable of producing large amounts of oxygen-enriched air having a high oxygen concentration and found that a polymer comprising a specific monomer as an essential component is suitable as the material for such membrane. The present invention has been accomplished based on this finding.

DETAILED DESCRIPTION OF THE INVENTION

The present invention provides a gas separating membrane prepared from a polymer comprising a monomer represented by the formula (1):

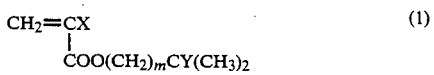

(1)

wherein X is chlorine atom or fluorine atom, Y is hydrogen atom or methyl group, and m is 0 or an integer of 1 to 5, and a gas separating membrane prepared from a polymer which comprises the monomer of the formula (1) in an amount of up to 100% by weight and other ethylenically unsaturated monomer in an amount of not more than 50% by weight, based on the combined weight of the monomer of the formula (1) and the other ethylenically unsaturated monomer.

The molecular weight of the polymer according to the present invention has a distribution of about 10,000 to about 5,000,000 as determined by gel permeation method. A number average molecular weight of the polymer in the invention is about 200,000 to about 2,000,000.

Examples of the above-mentioned other ethylenically unsaturated monomers, i.e. monomers other than the monomers of the formula (1) are alkyl α-fluoroacrylate, fluoroalkyl α-fluoroacrylate, alkyl methacrylate, fluoroalkyl methacrylate, styrene, acrylonitrile, vinyl acetate, alkyl acrylate, fluoroalkyl acrylate and the like. Usually the alkyl groups and fluoroalkyl groups described above have 1 to 20 carbon atoms and may have oxy group in the carbon chain.

Polymerization methods for polymerizing the monomer or monomers in the present invention include conventional methods of solution polymerization, mass (block) polymerization or suspension polymerization and so on (see Japanese Unexamined Patent Publication No. 111309/1986). The polymerization is carried out usually at 0° C. to about 150° C. using about 100 parts by weight of monomer or monomers, about 0.01 to about 5 parts by weight of a polymerization initiator, 0 to about 10 parts by weight of a chain transfer agent and an excess amount of solvent. Examples of useful polymerization initiators are benzoyl peroxide, dicumyl peroxide, tertiary butyl peroxide and like organic peroxides, azobisisobutyronitrile and like azo compounds, etc. Examples of useful chain transfer agents are lauryl mercaptan and the like. Useful solvents include ethyl acetate, chloroform, methyl ethyl ketone and the like.

The polymer obtained by the above-noted polymerization is applied to the smooth-surfaced plate made of glass, metal or the like or to a porous substrate of film or hollow fiber of polytetrafluoroethylene, polypropylene, polyethylene or the like, for example, by conventional film-forming methods such as bar coater, spin coater, dipping or Langmuir method to form a membrane. Generally the membrane formed on the smooth-surfaced plate of metal or the like is used as fixed to a suitable substrate, and the membrane formed on the porous substrate is used as adhered thereto. The thickness of the membrane is usually about 0.1 to about 200 μm.

The oxygen permeability coefficient ($KO_2$) of the gas separating membrane of the invention is not smaller than $10 \times 10^{-10}$ cm$^3$.cm/cm$^2$.sec.cmHg and the separation coefficient (α) thereof, i.e. the ratio of oxygen permeability coefficient to nitrogen permeability coefficient, is not smaller than 3.5.

The polymer useful as the materials of the gas separating membranes of the present invention finds applications not only in the production of oxygen-enriched air but also as contact lenses, separators for electric cells or the like by utilizing its high permeability to oxygen.

EXAMPLES

Example 1

Into a glass ampoule were placed 100 parts by weight of a monomer represented by the formula $CH_2=CFCOOC(CH_3)_3$, 150 parts by weight of ethyl acetate and 1 part by weight of azobisisobutyronitrile. After freezing deaeration and nitrogen replacement were repeated three times, the mixture was left to stand in a constant temperature bath at 50° C. for 15 hours to undergo polymerization.

The polymer thus obtained was dried at 150° C. under reduced pressure and was dissolved in toluene to form a 5 wt% solution. The solution was poured onto a glass Petri dish on which the toluene was evaporated off, giving a sample of gas separating membrane.

Using the membrane sample thus obtained, the oxygen permeability coefficient ($KO_2$) and nitrogen permeability coefficient ($KN_2$) were determined according to ASTM 1434 (V method) under the following conditions. Thereafter the separation coefficient between oxygen and nitrogen ($\alpha = KO_2/KN_2$) was determined. A table below shows the thickness of the membrane sample and values of $KO_2$, $KN_2$ and $\alpha$. Conditions for measuring the permeability coefficient (1) Gas used: standard mixture of 79% by volume of nitrogen and 21% by volume of oxygen
(2) Test pressures: primary pressure 4 kg/cm² (absolute) and secondary pressure 1 kg/cm² (absolute)
(3) Amount of permeation of gas: 4 cc
(4) Testing time: time taken for the permeation of the gas (sec.) through the membrane
(5) Thickness of membrane: value obtained by measuring the weight of polymer on the substrate and dividing the weight by the area of the polymer fixed to the substrate and the specific gravity of the polymer Examples 2 and 3 and Comparison Examples 1 and 2

Polymerization was conducted and a membrane was formed by repeating the same procedure as in Example 1 with the exception of using the monomers shown below in place of the monomer used in Example 1. The table below shows the thickness of membrane samples and values of $KO_2$, $KN_2$ and $\alpha$.

Example 2: $CH_2=CFCOOCH_2C(CH_3)_3$
Example 3: $CH_2=CFCOOCH(CH_3)_2$
Comparison Example 1: $CH_2=C(CH_3)COOCH_2C(CH_3)_3$
Comparison Example 2: $CH_2=CFCOOCH_2CH(CH_3)(C_4H_9)$

TABLE

| | Thickness of membrane (μm) | $KO_2$ ($\times 10^{-10}$) | $KN_2$ ($\times 10^{-10}$) | $\alpha$ |
|---|---|---|---|---|
| Ex. | | | | |
| 1 | 40 | 10.16 | 2.246 | 4.52 |
| 2 | 33 | 21.64 | 5.313 | 4.07 |
| 3 | 100 | 10.55 | 2.633 | 4.01 |
| Comp. Ex. | | | | |
| 1 | 172 | 18.79 | 5.177 | 3.63 |
| 2 | 65 | 29.28 | 10.25 | 2.86 |

In the table, the units of $KO_2$ and $KN_2$ are cc.cm/cm².sec.cmHg.

Effects of the Invention

Conventional gas separating membranes for producing oxygen-enriched air are either those producing only small amounts of oxygen-enriched air although in a high oxygen concentration (40% by volume) or those producing oxygen-enriched air in only a low oxygen concentration (30% by volume) although in large amounts. In contrast, the gas separating membranes of the present invention are capable of producing large amounts of oxygen-enriched air having a high oxygen concentration (about 40% by volume) and are suitable especially for medical applications.

We claim:

1. A gas separating membrane prepared from a polymer comprising a monomer represented by the formula

wherein X is chlorine atom or fluorine atom, Y is hydrogen atom or methyl group, and m is 0 or an integer of 1 to 5.

2. A gas separating membrane prepared from a polymer according to claim 1 which comprises the monomer of the formula (1) in an amount of up to 100% by weight and other ethylenically unsaturated monomer in an amount of not more than 50% by weight, based on the combined weight of the monomer of the formula (1) and the other ethylenically unsaturated monomer.

* * * * *